(12) United States Patent
Wren et al.

(10) Patent No.: US 8,149,278 B2
(45) Date of Patent: Apr. 3, 2012

(54) SYSTEM AND METHOD FOR MODELING MOVEMENT OF OBJECTS USING PROBABILISTIC GRAPHS OBTAINED FROM SURVEILLANCE DATA

(75) Inventors: Christopher R. Wren, Arlington, MA (US); Yuri A. Ivanov, Arlington, MA (US); Alexander Sorokin, Champaign, IL (US); Ishwinder Kaur Banga, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 1459 days.

(21) Appl. No.: 11/671,016

(22) Filed: Feb. 5, 2007

(65) Prior Publication Data
US 2008/0130951 A1    Jun. 5, 2008

Related U.S. Application Data

(63) Continuation-in-part of application No. 11/565,264, filed on Nov. 30, 2006.

(51) Int. Cl.
*H04N 7/18* (2006.01)

(52) U.S. Cl. .................................... 348/143; 348/154

(58) Field of Classification Search ............... 348/143, 348/154
See application file for complete search history.

(56) References Cited

U.S. PATENT DOCUMENTS

| | | | |
|---|---|---|---|
| 6,295,367 B1 * | 9/2001 | Crabtree et al. | 382/103 |
| 2004/0212678 A1 * | 10/2004 | Cooper et al. | 348/155 |
| 2005/0185053 A1 * | 8/2005 | Berkey et al. | 348/155 |
| 2006/0017807 A1 * | 1/2006 | Lee et al. | 348/36 |
| 2006/0197664 A1 * | 9/2006 | Zhang et al. | 340/555 |
| 2010/0013935 A1 * | 1/2010 | Ma et al. | 348/169 |

* cited by examiner

*Primary Examiner* — Alina N Boutah
*Assistant Examiner* — Steven Nguyen
(74) *Attorney, Agent, or Firm* — Dirk Brinkman; Gene Vinokur

(57) ABSTRACT

A method and system tracks models and predict object movement in an environment. Sequences of temporally and spatially adjacent events sensed by the set of sensors are linked to form a set of tracklets. Each tracklet has an associated starting and terminating location. The tracklets are used to construct a directed graph including starting nodes, terminating nodes, and, intermediate nodes connected by edges. The intermediate nodes can be split nodes where tracklets diverge onto different tracks, and join nodes where multiple tracklets converge onto a single path. Probabilities are assigned to the edges to model and predict movement of the objects in the environment.

14 Claims, 11 Drawing Sheets

200

SYSTEM AND METHOD FOR MODELING MOVEMENT OF OBJECTS USING PROBABILISTIC GRAPHS OBTAINED FROM SURVEILLANCE DATA

RELATED APPLICATION

This application is a Continuation-in-Part of U.S. patent application Ser. No. 11/565,264, "Surveillance System and Method for Tracking and Identifying Objects in Environments" filed by Ivanov et al. on Nov. 30, 2006.

FIELD OF THE INVENTION

This invention relates generally to surveillance systems and object tracking methods, and more particularly to modeling and the movement of objects from surveillance data.

BACKGROUND OF THE INVENTION

Video cameras and relatively simple sensors make it possible to construct mixed modality surveillance systems for large environments. Although the sensors cannot identity objects, the sensors can detect objects in a relatively small area. The identification can be done from the images of videos acquired by the cameras when the images are available.

Storage for videos acquired by such systems can exceed many terabytes of data. Obviously, searching the stored data collected over many months for specific objects, in a matter of seconds, is practically impossible. Therefore, it is desired to locate objects according to motion discrete events detected by simple sensors. Furthermore, it is desired to model and predict the movement of objects from the motion events.

SUMMARY OF THE INVENTION

In a conventional surveillance system, tracking of objects, such as people, animals and vehicles, is usually performed by means of image and video processing. The disadvantage of such a surveillance system is that when a specific object needs to be tracked and identified, the object needs to be observed by a camera. However, many surveillance environments require a large number of video cameras to provide the complete coverage necessary for accurate operation. A large number of video streams increase the computational burden on the surveillance system in order to operate accurately.

The embodiments of the invention provide a mixed modality surveillance system. The system includes a large number of relatively simple sensors and a relatively small number of movable cameras. This reduces cost, complexity, network bandwidth, storage, and processing time when compared with conventional surveillance systems.

Objects in an environment are tracked by the cameras using contextual information available from the sensors. The contextual information, collected over many months can be searched to determine a track of a specific object in a matter of seconds. Corresponding images of the objects can then be used to identify the object. This is virtually impossible with conventional surveillance systems that need to search a huge amount of video data.

The embodiments also provide a method and system for modeling and predicting the movement of the objects by determining probabilities to the tracks. As a distinguishing feature, the invention does not require perfect tracks before analysis. Most prior art surveillance tracking systems require a reliable pre-processing step. This implies high-fidelity sensors and computationally complex methods to eliminate all ambiguities.

In contrast, the invention can work with relatively simple (binary) motion sensors, and imperfect tracks that have ambiguities. The invention resolves the ambiguities by assigning probabilities to edges in graphs that represent the tracks.

DETAILED DESCRIPTION OF THE PREFERRED EMBODIMENTS

Surveillance System

Figure 1:
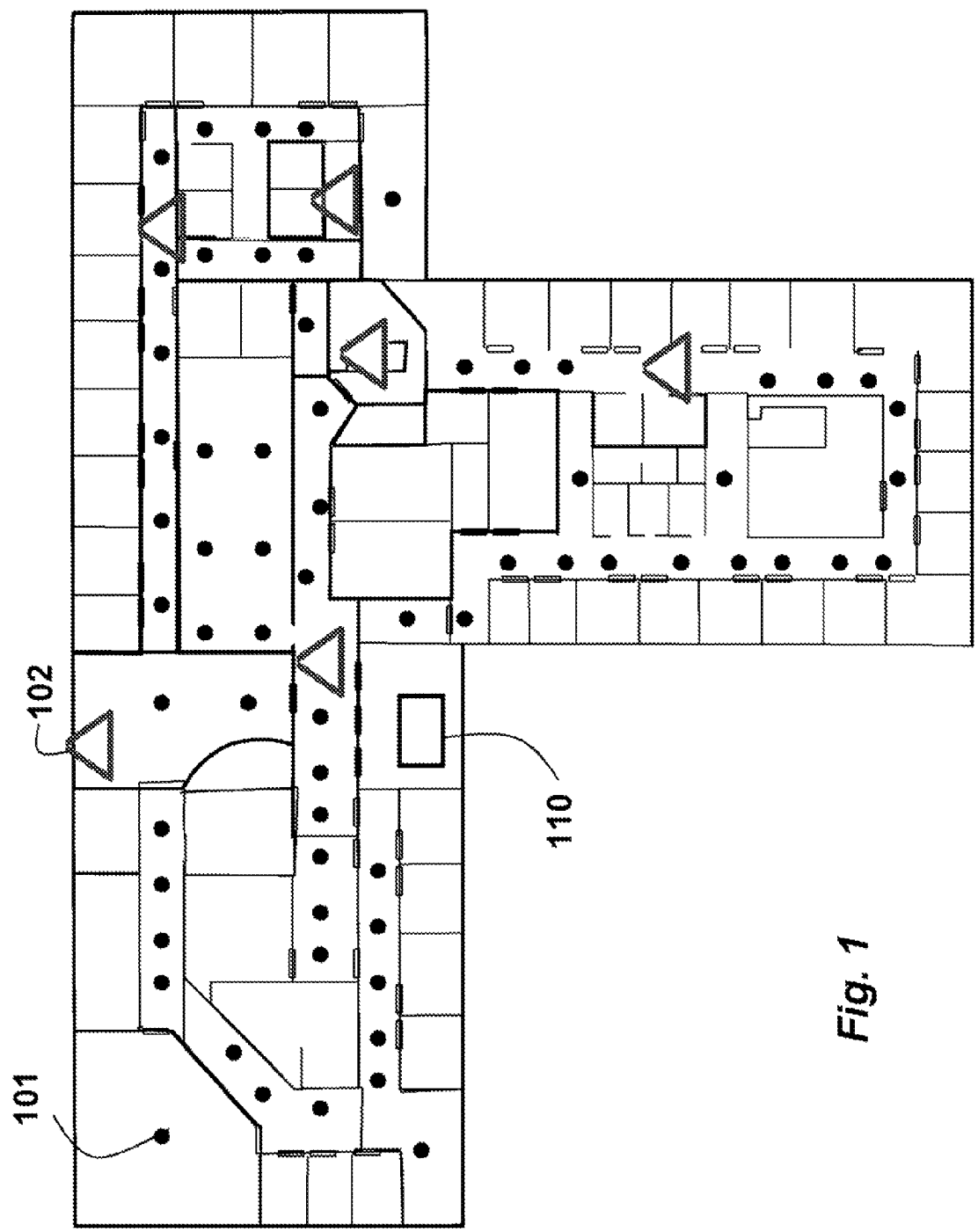
FIG. 1 is a diagram of environment in which the tracking system is implemented according to an embodiment of the invention.

As shown in FIG. 1, a surveillance system in which a tracking module is implemented according to the embodiments of our invention includes a relatively large set of wireless network of sensors (dots) 101 and relatively small set of pan-tilt-zoom (PTZ) cameras (triangles) 102. The ratio of sensors to cameras can be very large, e.g., 30:1, or larger.

Sensors

The sensors can be motion sensors, and door, elevator, heat, pressure and acoustic sensors. Motion sensors, such as infra red sensors, can detect the movement of objects in a vicinity of the sensor. Door sensors can detect door opening and closing events, typically indicative of a person passing through the doorway. Elevator sensors can similarly indicate the arrival or departure of people in an environment. Acoustic sensors, e.g., transducers and microphones, can also detect activity in an area. Sensors can be mounted on light switches, or power switches of office equipment in the environment. Pressure sensors in mats can also indicate traffic passing by. Security sensors, such as badge readers at entryways into the environment can also be incorporated.

Each sensor is relatively small, e.g., 3×5×6 cm for motion sensor. In a preferred embodiment, the sensors are densely arranged in public areas, spaced apart about every ten meters or less, and mounted on ceilings, wall, or floors. However, it should be noted that the spatial arrangement and density of the sensors can be adapted to suit a particular environment, and traffic flow in the environment. For example, high traffic areas have a denser population than low traffic areas.

In one embodiment of the invention, the set of sensors communicate with a processor 110, see FIG. 1, using industry standard IEEE 802.15.4 radio signals. This is the physical layer typically used by Zigbee type of devices. Each battery operated sensor consumes approximately 50 μA in detector mode, and 46 mA when communicating. A communication interval due to an activation is about 16 ms. It should be noted, the sensors can also be hard wired, or use other communication techniques.

When an event is detected by any of the sensors 101, a sensor identification (SID) and a time stamp (TS) corresponding to the event is broadcast, or otherwise sent to the processor 110. The processor stores the sensor data as a surveillance database in a memory. The identification inherently indicates the location of the sensor, and therefore the location of the event that caused, the activation. It only takes a small number of bytes to record an event. Therefore, the total amount of sensor data collected over a long period of operation is essentially negligible when compared with the video data.

The set of cameras are used to acquire video data (image sequences). The images have an inherent camera identification (CID or location) of the camera and frame number (FN). As used herein, the frame number is synonymous with time. That is, time can directly be computed from the frame number. Additionally, every time instant is associated with a set of pan-tilt-zoom parameters of each camera such that the visible portion of scenes in the vicinity of the sensors at any time instant can be calculated during a database query.

The cameras are typically ceiling mounted at strategic locations to provide maximum surveillance coverage, for example, at locations where all traffic in the environment must pass at some time. It is possible to orient and focus the PTZ cameras 102 in any general direction. Detection of an event can cause any nearby video cameras to be directed at the scene in the vicinity of the sensor to acquire video images, although this is not required. The ID and TS of the associated sensor(s) can later be used to retrieve a small sequence of images, i.e., a video clip related to the event. It should also be noted, that if no events are detected in the vicinity of a sensor near a particular camera, the acquisition of images can be suspended to reduce the amount of required storage.

It is a challenge to review video data acquired over many months of operation to locate specific events, tracks of specific objects, and to identify the objects.

Tracklets and Tracklet Graph

Figure 2:
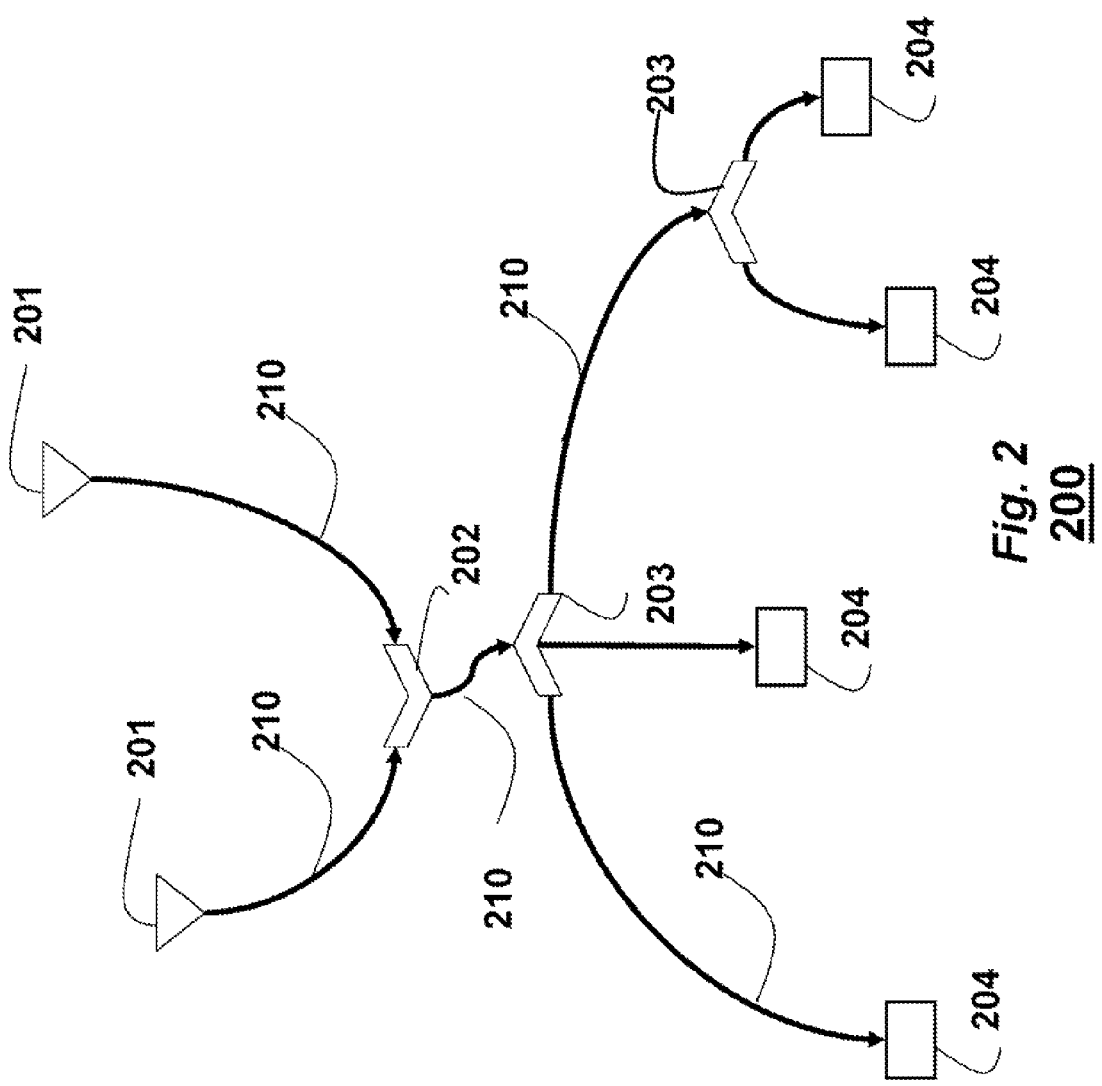
FIG. 2 is a diagram of a tracklet graph according to an embodiment of the invention.

As shown in FIG. 2, one embodiment of the invention uses a set of tracklets 210. A corresponding tracklet graph 200 is aggregated from the set of tracklets 210. A tracklet is formed by linking a sequence of temporally adjacent discrete events at a sequence of spatially adjacent sensors 101. A tracklet is an elementary building block of a tracklet graph 210. The term "discrete event" is used to indicate that movement near a sensor can be signaled by a single, time-stamped bit. This is unlike cameras that stream a continuous signal in the form of a video.

We will call the process of finding the immediate predecessor or successor event to a current event linking. The linking and storing of tracklets can be performed periodically to improve the performance of the system. For example, the linking and storing can be performed at the end of a working day, or even hour. Thus, when a search needs to be performed, the pre stored tracklets are readily available.

In the constructed tracklet graph 200, the tracklets are the directed edges connected at nodes of the graph. The nodes of the graph encode the relation of each tracklet to its immediate successor or predecessor. The node can have one of four types: Track Start 201, Track Join 202, Track Split 203 and Track End 204.

Track Start

The track start node represents the first event in the tracklet such that no preceding events can be associated with the sensor within a predetermined time interval. As used herein, preceding means an earlier event at an adjacent sensor. The time interval can constrained approximately to the time it takes for a walking person to travel from one sensor to the next adjacent sensor.

Track Join

The track join node represents an event in the tracklet graph such that there exist multiple preceding events that can be associated with to the sensor within the predetermined time interval. That is, the tracklet join node represents a convergence of multiple preceding tracklets to a single successor tracklet. A single valid predecessor tracklet cannot exist as it would have already been linked into the current tracklet.

Track Split

A track split node represents an event in the tracklet such that there exist multiple successor tracklets that can be associated with the sensor within the predetermined time interval. That is, the tracklet split node represents a divergence from a single preceding tracklet to multiple successor tracklets. A single valid successor tracklet cannot exist as it would have already been linked into the current tracklet.

Track End

The track end node represents the last event in the tracklet such that it cannot be associated with any subsequent events within the predetermined time interval. All tracklets form a set of graphs, each of which represents an inherent ambiguity about actual tracks traveled by objects.

The tracklet graph is the set of tracklets associated with events that can be aggregated according to the temporal and spatial constraint, which can be either imposed by the user, or 'learned' over time.

The tracklet graph in FIG. 2 has two starting tracklets, which subsequently converge into a single track. The converged tracklet then splits twice resulting in four end points. The tracklet graph is the core representation of the events that we use for the purposes of object tracking.

Extended Tracklet Graphs

For the purposes of extended tracking in the instances, when an object disappears out of view of the sensor network, two spatially adjacent, and temporally adjacent tracklet graphs can still be aggregated. This situation frequently occurs in an environment when tracked people exit public areas such as hall ways and enter areas such as offices. The event of entering the office terminates a predecessor tracklet at the tracklet end node when the person is no longer sensed or observed. Upon leaving the office, the person can be tracked again in the successor graph. If is assumed that when a person enters an office, the person must eventually leave the office, even after an extended period of time, e.g., hours. In this case, the spatial restriction can be strictly enforced, while the temporal constraint can be relaxed.

The graphs can be aggregated under the condition that one of the track end nodes of tracklets in the predecessor graph has timestamps that are less than the timestamp of at least one tracklet start node of tracklets in the successor graph.

Determining Sensor Visibility

One goal of the invention is to determine when an area in the vicinity of a sensor is visible from any of the cameras. This minimizes the amount of irrelevant images that are presented to the user.

To achieve this goal, all cameras in the system are calibrated to the locations of the sensors. In our system, each sensor is associated with a range of pan, tilt and zoom parameters of each camera, that make events which caused the sensor activations be visible from that camera. If the PTZ parameters of each camera are stored in the surveillance database every time that the camera orientation changes, then when a tracklet is retrieved from the database for each sensor activation, the 'visibility' ranges can be compared with the PTZ parameters of each camera at the corresponding time. If the PTZ parameters of the camera fall within the visibility range of the sensor, then the sensor activation (event) is considered to be visible and the sequence of images from the corresponding camera is retrieved as video evidence. This evidence is subsequently displayed to the user during the tracklet selection process using a user interface as described below.

Human Guided Tracking

The task of human guided tracking and search that we solve with our system can be illustrated with a simple scenario.

A laptop was reported stolen from an office between 1:00 pm and 2:00 pm. There was no direct camera coverage available for the office. The user needs to find all people that could have passed by the office during that time, and possibly identify them and collect evidence connecting an individual with the event. In such a situation, the operator would want to identify all tracks that start at the door of the office and to identify the individual by examining all available video evidence.

General Principles of Object Tracking with Mixed Modality Sensor Network

Track start and track end nodes are unambiguous beginnings and ends of complete tracks. However, automatic resolution of track splits and track joins ambiguities is impossible using only sensed events. The ambiguities of splits and joins are due to the perceptual limitations of the sensor network to any features other than the events at or near the sensors.

In such situation, the event of two people crossing tracks in the hallway causes the system to generate at least four tracklets containing events for each person before and after the possible crossover point. Without further information, there is an inherent ambiguity in the interpretation of this set of tracklets. For example, the two people can either pass each other, or meet and return the way they came. Mapping the identity to these tracks and maintaining their continuity with absolute certainty is impossible from just the events.

In the light of these ambiguities, we make the following simplifying observations.

The user does not need to disambiguate the entire graph. The user only needs to disambiguate track join nodes starting the selected tracklet, or track split nodes ending the selected tracklet for forward or backward graph traversal respectively.

Resolving track joins and track splits ambiguities can be simplified by considering video clips associated with each candidate track.

The first observation significantly reduces the amount of tracklets that need to be considered as possible candidates to be aggregated into the track. In one embodiment, the user tracks only one person at a time. Therefore, the system only needs to resolve the movement of that person, while effectively ignoring other events. For the example of two people crossing tracks, we assume one tracklet is selected before the crossover, and therefore, only two tracklets need to be considered as a possible continuation and not all four. This iterative focused approach to tracking and track disambiguation allows us to reduce the complexity of the problem from potentially exponential to linear.

The second observation implies that when a split and join ambiguity occurs, the system can correlate the time and location of the tracklets with the video from the nearest cameras, and display the corresponding video clips to the user to make the decision about which tracklet is the plausible continuation for the aggregate track.

It may be possible to develop automated tracking procedures that attempt to estimate the dynamics of the motion of the objects using just the network of sensors. However, any such procedures will inevitably make mistakes. In surveillance applications, the commitment to results of even slightly inaccurate tracking process can be quite costly.

Therefore, our tracking method uses a human guided technique with the tracklet graphs as the underlying contextual information representing the tracking data. It should be noted, that the sensor data on which the tracking and searching is based is very small, and can therefore proceed quickly, particularly when compared with conventional searches of video data.

The main focus of our system is to efficiently search a large amount of video data in a very short time using the events. To this end, we are primarily concerned with decreasing the false negative rate, with a false positive rate being a distant secondary goal. In order to achieve these goals, we adopt a mechanism for track aggregation as described below.

Tracklet Aggregation

The process of human guided tracking of our system begins with selecting a subset of one or more sensors where we expect a track to begin, and optionally a time interval. For instance, in our system, where the sensors are placed in public areas outside of offices, the user can select the subset of sensors using a floor plan that can possibly be activated when the a person leaves a particular office.

By performing a fast search in the database of events, we can identify every instance of a tracklet that started at one of the selected sensors. At this point, the user can select a single instance of the tracklet to explore in greater detail. By specifying an approximate time when the track begins, the above search can be expedited.

Figure 3:
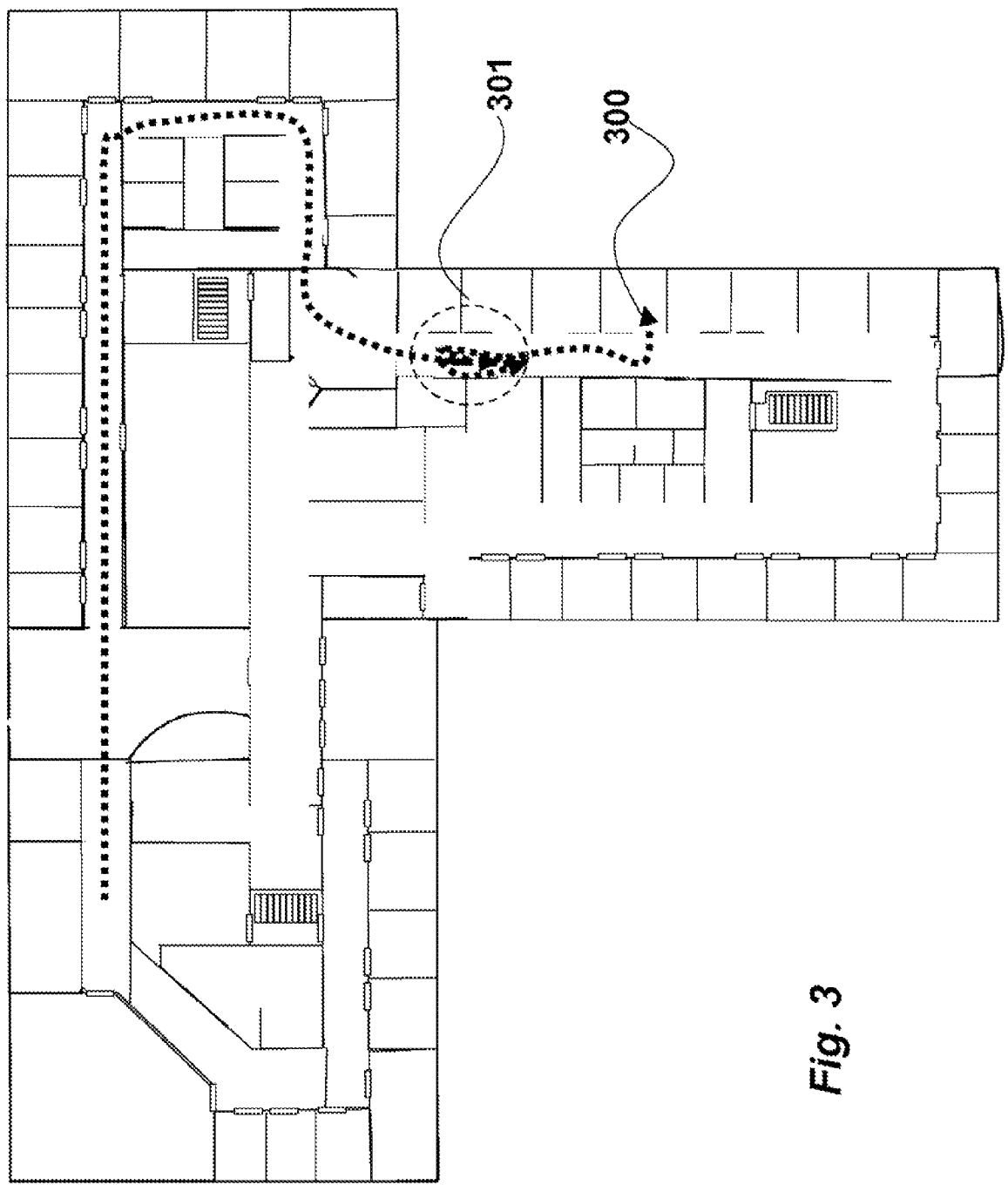
FIG. 3 is a block, diagram of the environment of FIG. 1 and a track of a tracked object according to an embodiment of the invention.

Upon selecting the first tracklet the corresponding tracklet graph is constructed. The aggregated track graph includes tracklets that are associated with temporally and spatially adjacent sequence of events. The selected tracklet is drawn on the floor plan up to the point where there is an end, a split or a node, as shown in FIG. 3. When the endpoint is reached, the track 300 is complete. A location of a person along the track 300 in the floor plan is visually indicated in the user interface by a thickening 301 in the track 300.

If the end of the tracklet has a split or join node, then the track is not terminated, and the process of tracklet aggregation proceeds iteratively, using the tracklet graphs to aggregate the candidate tracklets into a coherent track. During this process, at each ambiguity in the graph (split or join nodes), the user selects the subgraph to traverse further. Available video images from cameras oriented towards any of the sensor activations belonging to the corresponding tracklet can be displayed to identify persons and select the correct successor tracklet. Automated techniques such as object and face recognition can also be used for the identification.

Figure 4:
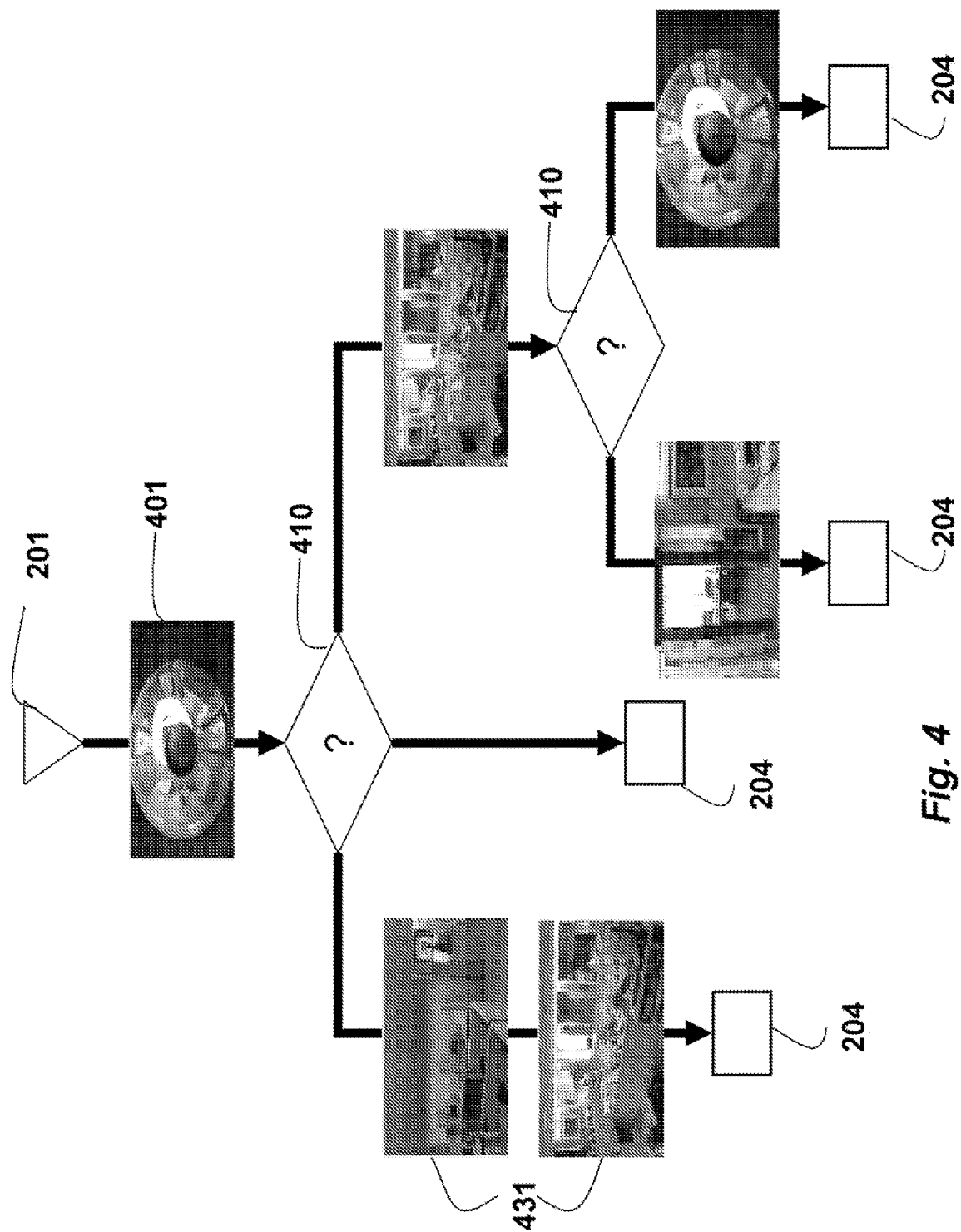
FIG. 4 is a diagram of a decision graph according to an embodiment of the invention.

The process is shown in FIG. 4 using a selection graph. In the selection graph, the video images 401 represent available video clips from cameras oriented towards sensors that are contained in the corresponding tracklets. The diamond 410 indicates an ambiguity, and possible conflicting tracklets following the ambiguity. Edges in the graph indicate that a tracklet exists.

Note that the tracklet selection graph in FIG. 4 is related to the tracklet graph in FIG. 2, but is not the same. In fact, the graph of FIG. 4 represents a general selection graph, which can be used for traversal of the tracklet graph either forward in time (as shown) or backwards. In the former case, the start and end nodes of the selection graph in FIG. 4 have the same meaning as those in the tracklet graph, while diamonds only represent splits. Track joins are irrelevant to the forward selection process, as they present no forward selection alternative. In contrast, if the selection graph is used for backward traversal, then start and end nodes of the selection graph have the opposite meaning to those of the tracklet graph and diamonds only represent joins.

In either case, the tracklet selection, graph represents a set of tracks through the tracklet graph that are possible to traverse beginning at the initially selected tracklet and the available camera frame 401 shown at the start node 201. Because the ambiguous points are known, at each such point the system can present the set of ambiguous tracklets to the user for disambiguation.

For example, at the first step, the ambiguous point 410 represents a three way split from the current node. The left most tracklet leads to two camera views 431. The middle tracklet terminates without having any camera views. The third tracklet has one camera view, and then leads to a two way split. Each of these tracklets can be drawn on the floor plan. After the selection is made, the rejected tracklets are removed from the floor plan. The process continues until the end track 204 is encountered.

When the end of a track is encountered, the process of track aggregation can terminate. However, if the user has a reason to believe that an actual track continues from the termination point, the tracklet graph extension mechanism as described above is used. The system performs a search in the database to find new tracklets that start at the location of the terminated track, within a predetermined time interval. If such tracklets are found, the corresponding video clips are identified and displayed to the user in the tracklet selection control panel as described below. When the users selects the initial track for the extended segment of the track, the tracklet is appended to the end of the aggregated track and a new tracklet graph is constructed that begins with the selected tracklet. Then, the selection process continues iteratively as described above to further extend the complete track of the object. In the complete track, all join and split nodes have been removed, and the track only includes a single starting tracklet and a single ending tracklet.

User Interface

Figure 5:
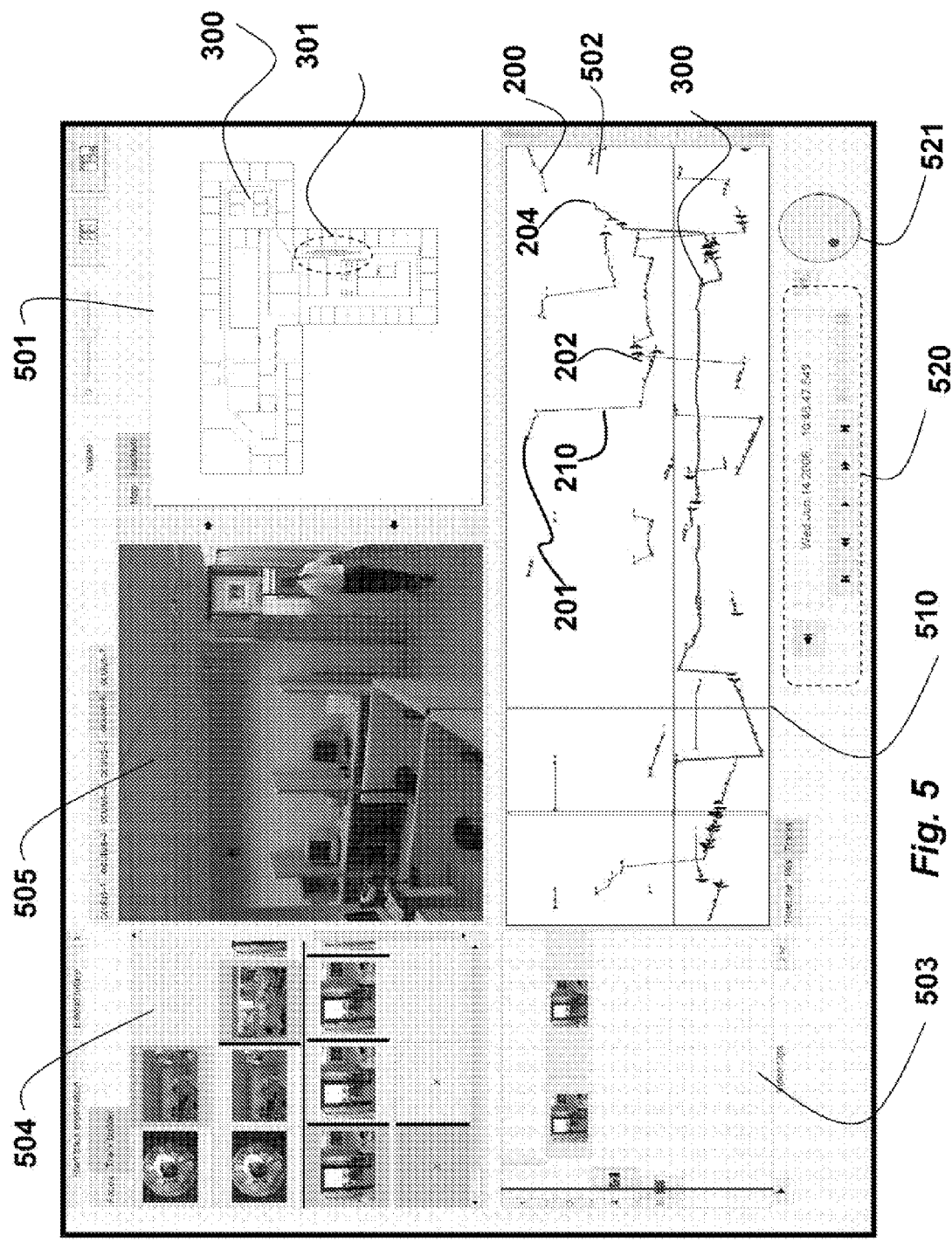
FIG. 5 is an image of a user interface according to an embodiment of the invention.

As shown in FIG. 5, in one embodiment the user interface includes five main panels, a floor plan 501, a timeline, 502, a video clip bin 503, a tracklet selector 504, and a camera view panel 505.

The floor plan is as shown in FIG. 3. A location of a person along the track 300 in the floor plan is indicated by a 'swell' 301 in the track 300. For each sensor, the time line 502 indicates events. Each row in the time line corresponds to one sensor, with time progressing from left to right. The vertical line 510 indicates the 'current' playback time. The menu and icons 520 can be used to set the current time. The 'knob' 521 can be used to adjust the speed of the playback. The time line can be moved forward and backwards by dragging the line with a mouse. The short line segments 200 represent tracklets, and the line 300 the resolved track, see FIG. 3.

The video clip bin shows images of selected clips (image sequences) for object identification. In essence, the collected sequences of images associated with the track in the video clip bin are video evidence related to the track and object.

The tracklet selection control shows the current state of the decision graph of FIG. 4.

Images corresponding to the current time and selected location are shown in the camera view panel 505. The images can be selected by the user, or automatically selected by a camera scheduling procedure. The scheduling procedure can be invoked during the playback of the clips to form the video clip bin 503.

Tracking Method

In the embodiment of this invention, the tracking process includes two phases: recording and retrieving surveillance data to track objects.

Figure 6:
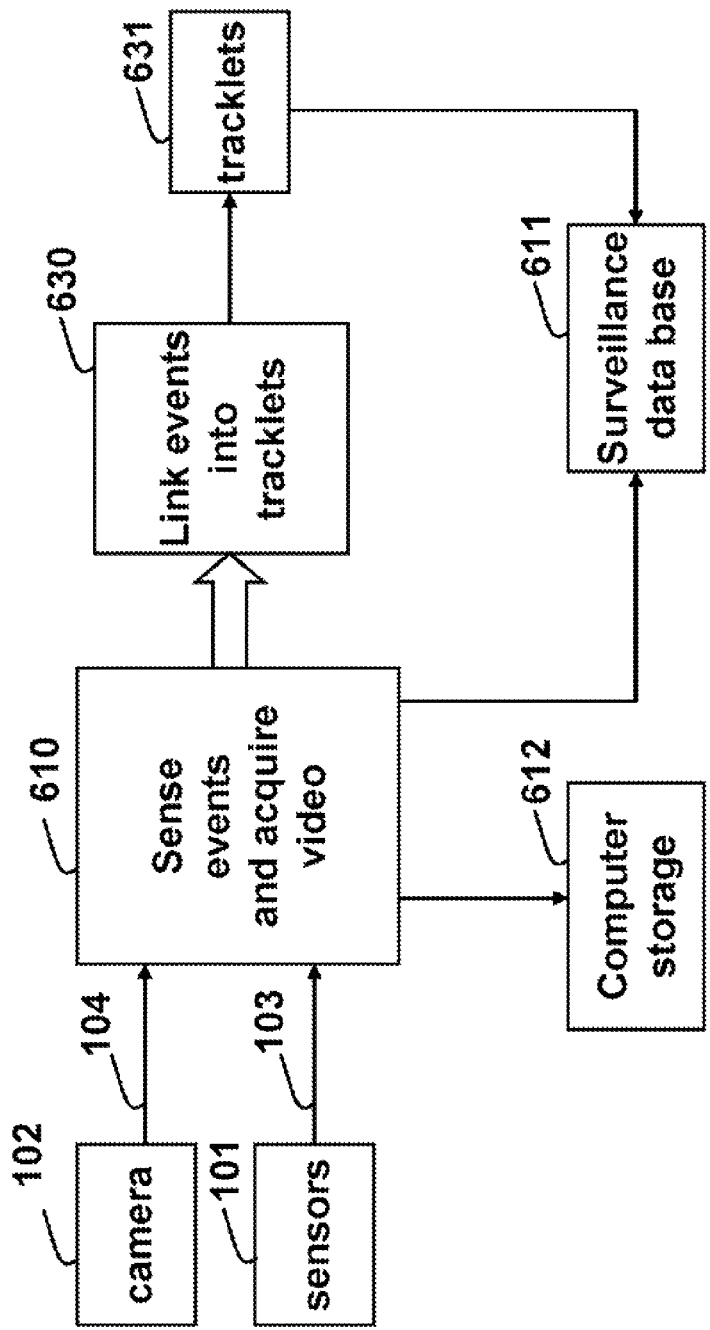
FIG. 6 is a flow diagram of a method for recording surveillance data according to an embodiment of the invention.

The recording phase is shown in FIG. 6. FIG. 6 shows a method that stores sensor data in a surveillance database 611. The surveillance database stores events 103 acquired by a set of sensors 101. Sequences of temporally and spatially adjacent events for the selected subset of sensors are linked 630 to form a set of tracklets 631. Each tracklet has a tracklet start node and a tracklet end node. The tracklets are also stored in the surveillance database.

Concurrently, with sensor activations, sequences of images 104 acquired by a set of cameras 102 are recorded on computer storage 612. Each event and image is associated with a camera (location) and time. Note, as stated above, the PTZ parameters of the cameras can also be determined.

Figure 7:
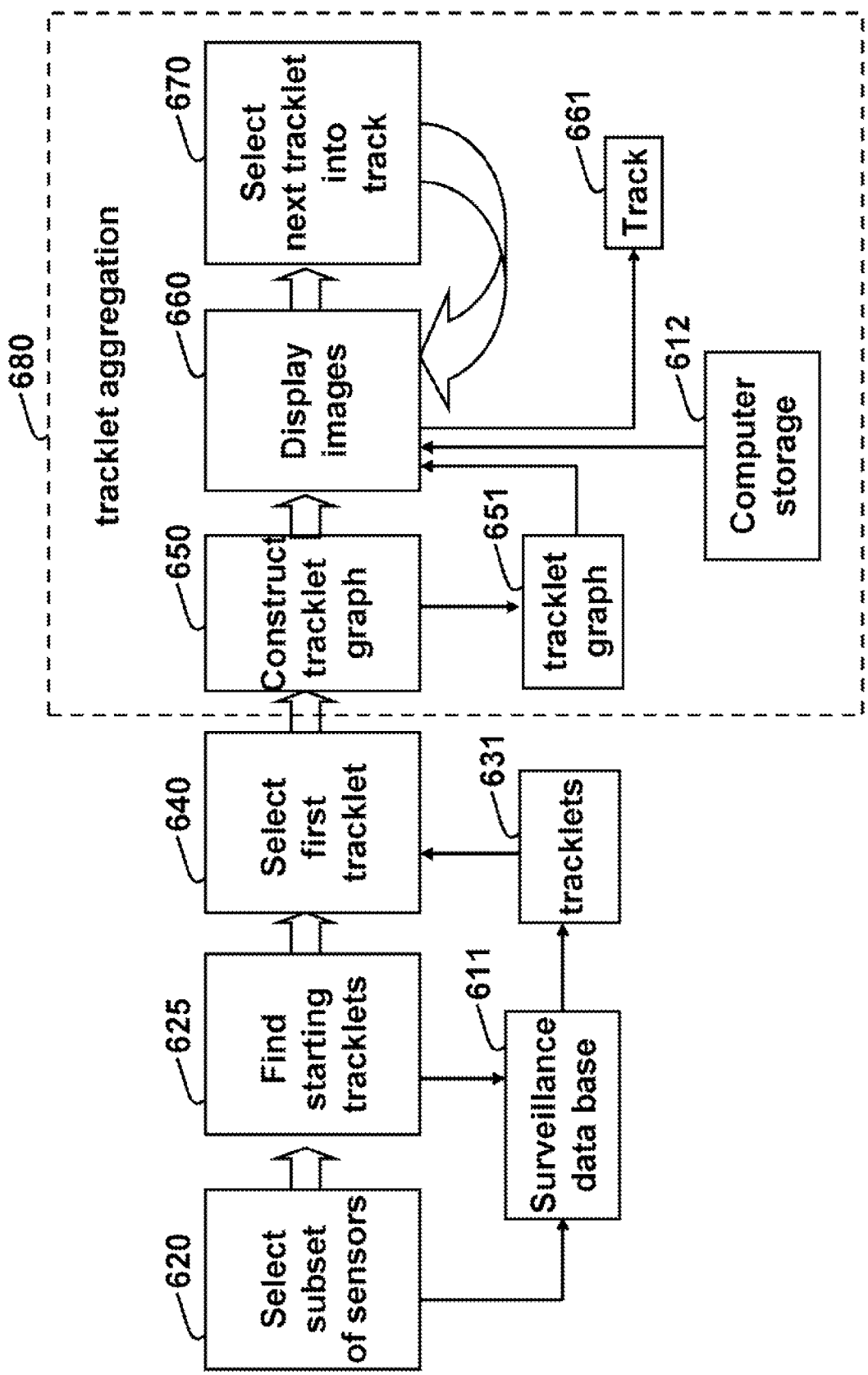
FIG. 7 is a flow diagram of a method for retrieving surveillance data to track objects according to an embodiment of the invention.

Tracking phase is shown in FIG. 7. This phase includes selecting a subset of sensors 620 where a track is expected to start, and finding 625 tracklets that can be used as starts of tracks, selecting 640 a first tracklet as a start of the track, and track aggregation 680.

Track aggregation starts with constructing 650 the tracklet graph 651 for the selected tracklet. The tracklet graph 651 has possible tracklet join nodes where multiple preceding tracklets merge to a single successor tracklet, and possible tracklet split nodes where a single preceding tracklet diverges to multiple tracklets.

The tracklet graph 651 is traversed iteratively starting from the initially selected tracklet. Following the graph, a next ambiguous node is identified, images correlated in time and space to the sensor activations (events) contained in candidate tracklets are retrieved from the computer storage 612 and displayed 660, and the next tracklet 670 to be joined with the aggregated track 661 is selected 670.

The process terminates when the aggregated track 661 is terminated with the tracklet having the track end node as its end point, and all join and split nodes have been removed from the graph.

Modeling Object Tracks and Predicting Movement of Objects

Above, we have described how to determine where objects, e.g., humans, have been according to discrete motion events. Now, we want to predict where objects might go, and to identify ambiguous movement of objects from the surveillance data acquired in an environment. Specifically, we want to predict movement that may be indicative of unusual or suspicious behavior.

We describe methods for modeling the movement of objects in the environment even when high quality (video) tracking is not possible, or is infeasible. The methods work for any interesting object, such as humans, cars, moving in a complex environment. By complex environment, we mean a large office building, manufacturing plant, or parking garage with perhaps hundreds or thousands of sensors, and a similar number of moving objects, such as workers and vehicles. In complex environments, the likelihood of collocated objects is relatively high, and the identity of the objects may be unknown.

First, we compare high and low quality by tracking. High quality tracking is the act of processing a continuous stream of sensor data from a collection of sensors, e.g., cameras and motion sensors, and generating a model of the movement of a particular individual. The model can be used to answer questions about the individual's starting, intermediate and terminating locations along a track traveled by the object. Tracking is generally conceived of as generating a deterministic track model, i.e., a best guess about the track of the individual through the environment.

Ambiguity in the model is considered to be a mistake, a failure of tracking, or unusual or curious movement of the object. High quality tracking systems can become very complex in an attempt to eliminate all ambiguities. If there are multiple individuals in the environment, then ambiguities will unavoidably arise.

In a surveillance system with the goal of generating a deterministic movement model for each object, those ambiguities are be represented as collections of hypothesis about the true configuration of the objects and environment that must be propagated, tested, and hopefully pruned against future events until only one true hypothesis remains.

Because ambiguities arise from the interactions of objects or individuals with each other, the number of hypothesis that must be considered can increase exponentially compared to the number of individuals in the environment.

Low quality tracking is the case where ambiguities are tolerated because resolving those ambiguities is either impractical, or in fact impossible.

High quality tracking systems typically require high quality sensors, because the events must include enough extra information to allow resolution of an ambiguity. A system tracking people might resolve such ambiguities by recognizing faces, or matching the color of clothing, or relying on key card or biometric scans.

In situations where those kinds of high quality sensors are not available, it can still be useful to draw inferences about the patterns of movement of objects in the environment with simple sensors that can only signal discrete events, e.g., the sensor is "off" when there is no motion, and "on" when there is motion. Rather than relying on perfect tracking output, we describe how to draw these inferences from collections of imperfect tracking models obtained by low quality motion sensors, which can only signal discrete motion events.

Tracklets

We use the concept of a tracklet, while embedding that representation in a probabilistic framework. The basic concept of a tracklet is that the tracklet aggregates discrete events that, are unambiguously related to each other. The tracklet concept, as described above, was developed as a way to represent ambiguity in object tracking for surveillance applications so that the system can efficiently interact with a user of the system to refine the imperfect tracking models in the graph of tracklets into a high quality track model.

Now, we embed the tracklet and the tracklet graph in a probabilistic model to enable us to draw inferences from a set of probabilistic graphs. In this way, the invention enables us to understand the patterns of movements of a population of individuals, or other objects, over a long span of time, not the specific movement of a single or small group of individuals over a short span of time.

Figure 8:
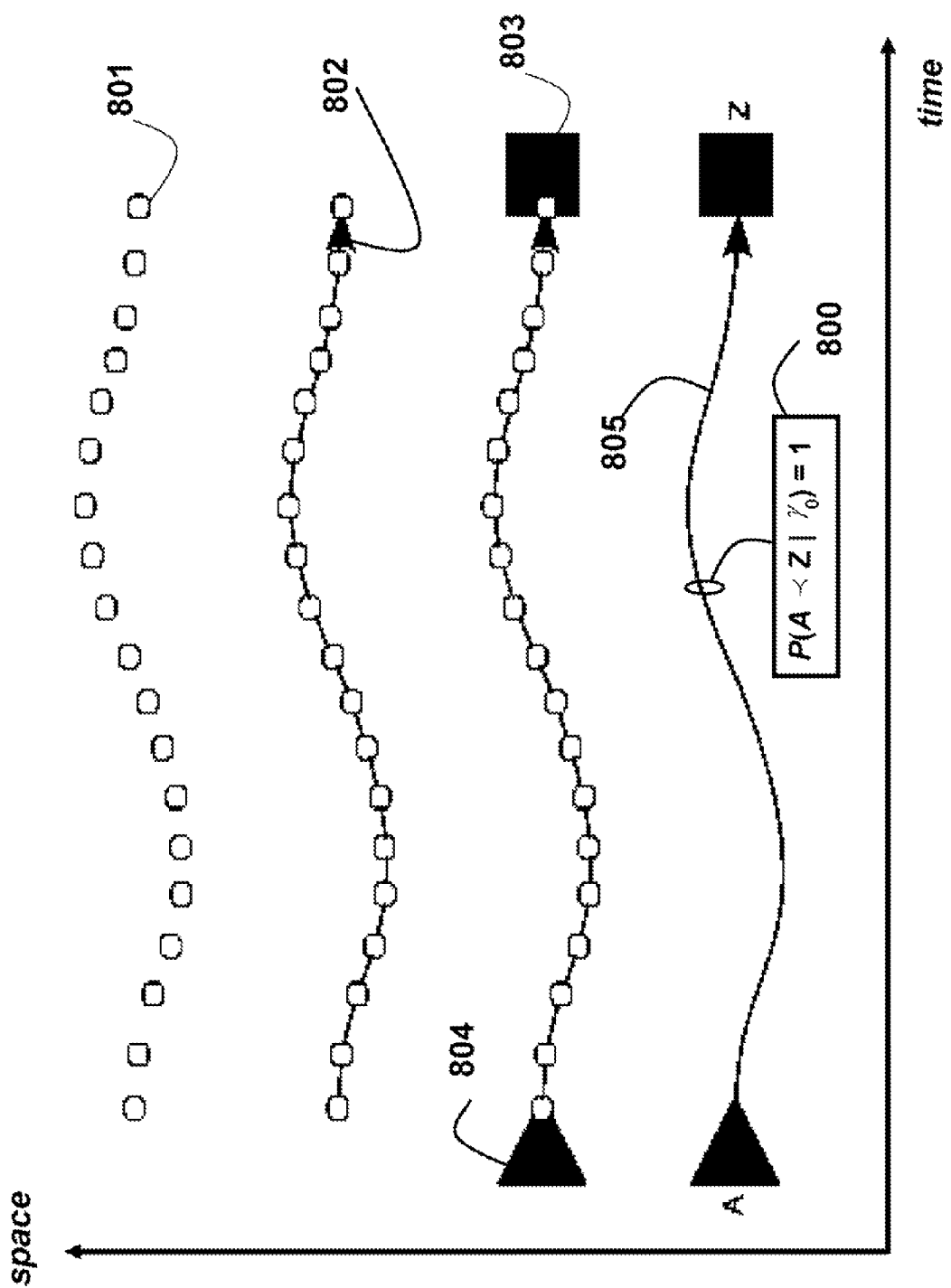
FIG. 8 is a diagram of discrete events detected by motion sensors and tracklets.

As shown simplistically in FIG. 8, a collection of events 801 is 'strung out' through space and time. The events can be, for example, motion events detected by simple, low quality motion sensors, as described above.

In the following, the events are synonymous with locations in the environment. A sensor can only detect motion in a relatively small area in the environment, for example object motion in a range of about 5 to 10 meters. Thus, the sensors detect moving objects in a relatively small area, and the events can be directly correlated to the locations of the sensors. If the sensors are located in hallways, and adjacent to offices assigned to particular individuals, then it also possible to predict with a relatively high probability the traffic patterns of particular individuals.

If the events are close to each other is space, sequential in time, and isolated from other events, then a simple model of movement of objects in the environment enables us to aggregate those events into a single track 802 as indicated by the solid arrow passing through the events. The arrow abstracts the sequence of discrete events into a tracklet, which is a model representing the fact that all the events in that collection were generated by the same individual, or small group of individuals, with very high probability.

Furthermore, if the sequence of events is not followed by any events that are close to the final event in space and time, then we say that the tracklet terminates. This is represented by the box node 803. Similarly, if the tracklet is not preceded by an event that is plausibly connected, to the other events in space and time, then the tracklet starts at that space-time and this is indicated by the triangle node 804. Subsequently, we can drop the events themselves, only showing the high level tracklet abstraction 805 from starting node A to terminating node Z.

A tracklet graph is directed. We refer to the simple graph 805 in FIG. 8 as graph The graph $\gamma_0$. The graph $\gamma_0$ indicates that the probability P of the terminating event detected at node Z is generated by the same individual that generated the event at starting node A is high.

Without loss of generality, the probability 800

$$P(A \prec Z | \gamma_0) = 1$$

means the probability that the event detected at node Z follows ($\prec$) from the event at node A, given the graph $\gamma_0$, is unambiguously unity.

Generally, the probability P is 0 if an object is not at a known location, and 1 if the object is at the known location, and 0<P<1 otherwise.

Tracklet Graph

Ambiguities in the environment generate more complicated graphs. Our graphs include nodes connected by directed edges, or tracklets, All events that share a possible common cause are linked together into the same connected graph. The nodes in the graph can include starting nodes, intermediate nodes, and terminating nodes. For the purpose of this description, the graphs include at least one intermediate node, such as a split or join node. Otherwise, there would not be any ambiguities, and the problem of tracking objects becomes deterministic and trivial. The intermediate nodes can include split nodes and join nodes.

Probabilities are assigned to the edges (tracklets) to indicate a likelihood that an object started at a particular node and terminated at another node. In other words, the probability is the likelihood that an event at the terminating follows from an event at the starting node, and the events are caused by the same object. A track runs from a starting node to a terminating node, and includes intermediate nodes to give rise to ambiguities.

Figure 9:
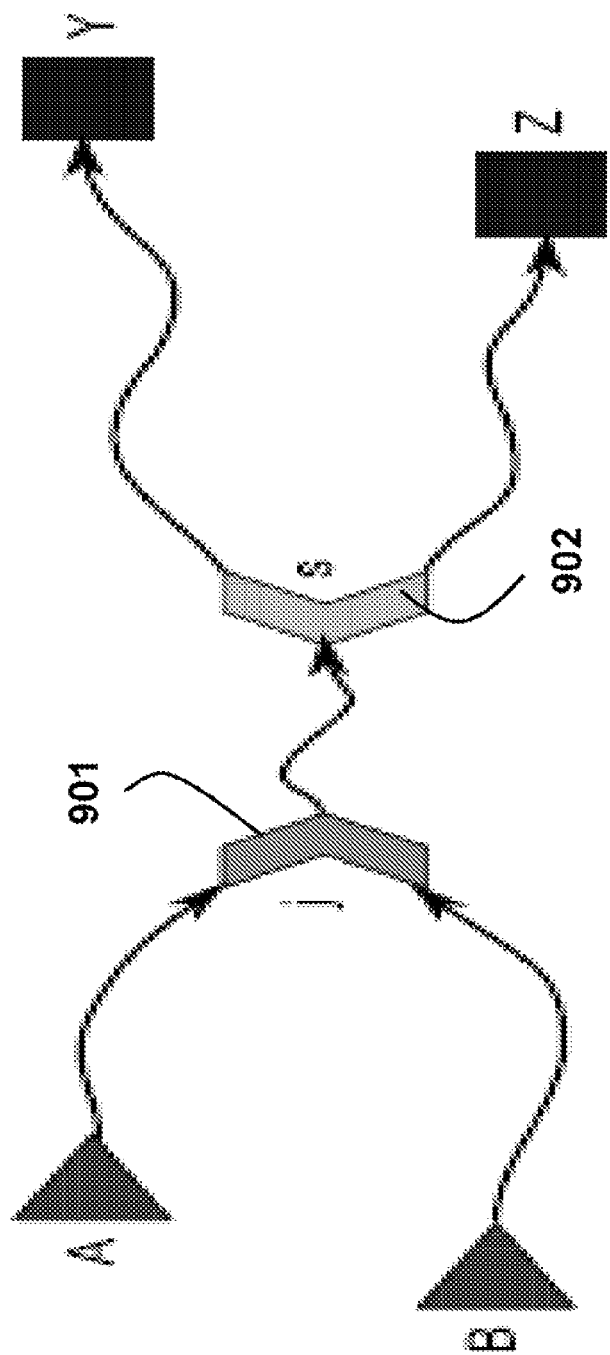
FIGS. 9 and 10 are diagrams of tracklet graphs according to an embodiment of the invention.

FIG. 9 shows a more complicated graph representing two or more individuals crossing tracks in the environment.

Chevrons 901 and 902 represent a join j and a split s, respectively. That is, several events follow the split s, within a small enough temporal and spatial neighborhood to generate ambiguity. In the case of the split, there are several individuals moving together or very near each other to be considered as joint actors in a tracklet. After the split, the track of each individual that traversed the tracklet from j to s is ambiguous: did the individuals move along the tracklet from split s to terminating node Z, or from split s to terminating node Y.

Given this graph, which we call $\gamma_1$, we do not know the track of an individual starting at node A, this ambiguity is expressed as the probability $$P(A \prec Z|\gamma_1) = p \text{ or } P(A \prec Y|\gamma_1) = q, \quad (1)$$

where we may decide that p=q, so that both outcomes are equally likely, or we may have 'learned' patterns of movement that cause us to bias our expectations one way or the other. The patterns can be learned manually by users of the system, or the patterns can be learned automatically over time. Because the individual or object at node A has to go somewhere, the probabilities in the graph must sum to unity:

$$p + q = 1.$$

Figure 10:
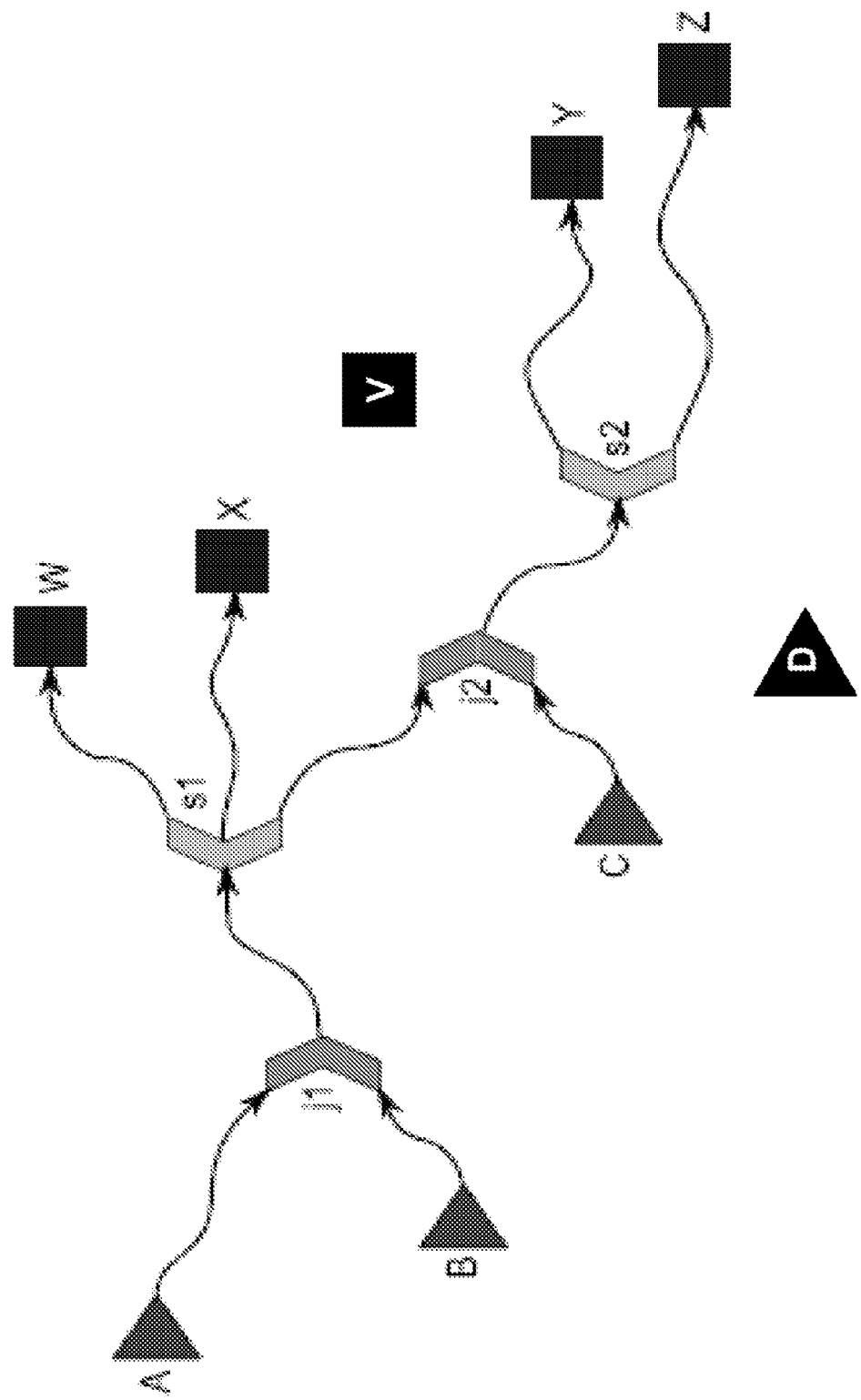

Graphs can become arbitrarily complex. The graph $\gamma_2$ in FIG. 10 is a much more complicated graph with several staring nodes A, B and C, several splits s and joins j, and terminating nodes W, X, Y and Z.

By tracing the directed edges in the graph, it is possible to connect the starting node A with any terminating node {W, X, Y, Z}, for example the probability $$P(A \prec W|\gamma_2) = P(A \prec j_1|\gamma_1|\gamma_2)P(j_1 \prec s_1|\gamma_2)P(s_1 \prec W|\gamma_2).$$

Here, we subscript the probabilities to indicate that:

$$P(A \prec W|\gamma_2) > 0 \quad (2)$$

$$P(A \prec X|\gamma_2) > 0 \quad (3)$$

$$P(A \prec Y|\gamma_2) > 0 \quad (4)$$

$$P(A \prec Z|\gamma_2) > 0 \quad (5)$$

so that an individual starting at node A may end up at any of those locations with some non zero probability. We may decide that all those outcomes are equally likely, or again, we may bias those probabilities based on information previously learned, such as habitual movement of individuals.

A more interesting case is that individuals starting at node C do not have as much ambiguity in their ultimate destinations. Because the edge from $s_1$ to $j_2$ is directed, that is the probability $$P(j_2 \prec s_1|\gamma_2) = 0,$$

so there is no plausible explanation for individuals starting at node C to end up at node W, or node X:

$$P(C \prec W|\gamma_2) = 0 \quad (6)$$

$$P(C \prec X|\gamma_2) = 0 \quad (7)$$

$$P(C \prec Y|\gamma_2) > 0 \quad (8)$$

$$P(C \prec Z|\gamma_2) > 0 \quad (9)$$

It is worth noting that the graphs are complete. That is, if there is a possible sequence of events associated with objects starting out at node C and ending up at a terminating node, then the terminating node is in the graph. However, if node V is not a terminating node in the graph, then the probability $$P(C \prec V|\gamma_2) = 0.$$

Similarly, for a starting node not found in a particular graph, there is no possible connection between that starting node and terminating nodes in this graph during the time spanned by the graph, e.g., the probability $$P(D \prec Z|\gamma_2) = 0.$$

Sets of Graphs

At a moment in time, several objects or individuals, moving about the environment in a seemingly uncoordinated fashion, happen to cross tracks, generate ambiguities, and thereby become the cohort of individuals who generated a particular tracklet graph instance, $\gamma$. The analysis above makes some weak assertions about the track of those individuals.

We now consider a set of graphs $\Gamma$, which describes the movement of a population of objects over a longer span of time.

We can ask questions of the form, "What does this set of graphs tell us about the probability that individuals travel from one location to another within a building." We can answer this question by retrieving all the graphs that contain and start at, for example node A, and count the number of graphs that contain a possible connection between nodes A and Z, possibly weighted by individual probabilities:

$$P(A \prec Z|\Gamma) = \frac{\sum_{i=0}^{N} P(A \prec Z|\gamma_i)}{M},$$

where N in the number of graphs in the set $\Gamma$. The number of graphs in the set $\Gamma$ that contain the node A as a starting node is M, which can be used as a normalization factor. The evidence for a connection, the probability $$P(A \prec Z|\Gamma)$$

can be accumulated as the events are received by constructing the tracklet graphs, and then accumulating the evidence for each sensor pair, as well as the number of graphs M.

It is possible to accumulate evidence for a repeated movement, even when there are no unambiguous tracklets showing the movement of objects in its entirety. If traffic starting at node A always terminates at node Z, then all the graphs in the set $\Gamma$ that contain node A as a starting node contain a plausible track from node A to node Z. This is a significant quantity of evidence.

The probability $P(A \prec Z|\Gamma)$ is the average evidence probability $P(A \prec Z|\gamma_i)$. That probability is smaller than when every example of that movement is completely unambiguous, then the probability $P(A \prec Z|\Gamma)$ is identically unity.

Conversely, a coincidental or unique movement that is never repeated gathers very little evidence in the numerator, but the denominator is the number of graphs containing the coincidental starting node, and the resulting value is very small for the sets of graphs.

It is possible to quantify traffic patterns in an environment by further aggregating evidence over populations of sensors as well as over graphs as the probability;

$$P(A \prec \Theta|\Gamma) = \frac{\sum_{i=0}^{N} P(A \prec Z|\gamma_i) \forall Z \in \Theta}{M},$$

where $\Theta$ is the set of terminating nodes, and the normalization factor M is the number of graphs in the set $\Gamma$ that contains a particular nods A of interest as a starting node, for example, a 'choke point' in an environment though which all traffic must pass. This enables us to measure the 'connectivity' between different areas in the environment.

A more general solution is to aggregate the probabilities for the starring nodes and terminating nodes over the graphs:

$$P(\Phi \prec \Theta | \Gamma) = \frac{\sum_{i=0}^{N} P(A \prec Z | \gamma_i) \forall A \in \Phi, Z \in \Theta}{M},$$

where $\Phi$ is the set of starting nodes. The sets $\Phi$ and $\Theta$ can be discontinuous, measuring the connections between groups of individuals that may be distributed across the environment.

In either case, the probability $$P(\Phi \prec \Theta | \Gamma)$$

represents the relative likelihood that a track, starting at a node in the set of graphs $\Phi$ terminates at a node in the set of graphs $\Theta$.

Connectivity Graphs

The probabilities $$P(A \prec Z | \Gamma)$$

between all starting and ending pairs of nodes A and Z in the environment represent an estimate of the probability that there is a repeated flow of people form one place in the environment to another. In environments, such as an office building, individual people are typically associated with particular offices. Thus, it is usually possible to associate an individual with a track starting outside a particular office. Similarly, if a track terminates at an office, the individual can again be identified with a relatively high probability. Usually, there are also a small number of shared resources at known locations, e.g., restrooms, kitchens, copiers, and printers. Then, the probabilities of nodes corresponding to those locations give an indirect measurement of the underlying connectivity between individuals and locations.

These probabilities can be clustered into two or more classes to generate deterministic graphs of connections and a connection quality between individuals.

In the prior art, these sorts of social 'networks' have been measured using on body sensors, e.g., RFID tags, or badges, that are easily lost and damaged and may be uncomfortable or inconvenient to wear and detect. Inferring networks from indirect, simple sensors arranged in the environment is a significant advantage of the invention.

Prediction

If a tracklet starts at sensor (node) A, then, given the set or subset of all terminating probabilities for that node is the probability $$P(A \prec Z | \Gamma) \forall Z \in \Theta.$$

Now it is possible to predict the most probable terminating node for that tracklet as $$P(Z | A, \Gamma) = \underset{Z}{\operatorname{argmax}} P(A \prec Z | \Gamma).$$

It is also possible to rank order all the terminating nodes by probability, and to use the relative probability as a weight for a probabilistic decision system, such as a system that predicts demand for elevators, lighting, heating systems, or other limited environmental resources.

This technique also generalizes the probability to include subset of nodes, such as "A, R, S, Z":

$$P(A \prec R \prec Z | \Gamma) = \frac{\sum_{i=0}^{N} P(A \prec R \prec Z | \gamma_i)}{M}$$

by making a more restricted graph.

The node A and R need not be sequential. They only need to be part of a plausible portion of the graph. That is, there may be intermediate nodes between node A and node R, and between node R and node Z. This becomes useful, for example, when there are many equivalent tracks between node A and node R, so that node R represents a particularly informative node in the graph.

This form can be extended to include subsets that include more than one intermediate node. Prediction then takes the probabilistic form;

$$P(Z | A \prec R, \Gamma) = \underset{Z}{\operatorname{argmax}} P(A \prec R \prec Z | \Gamma).$$

Figure 11:
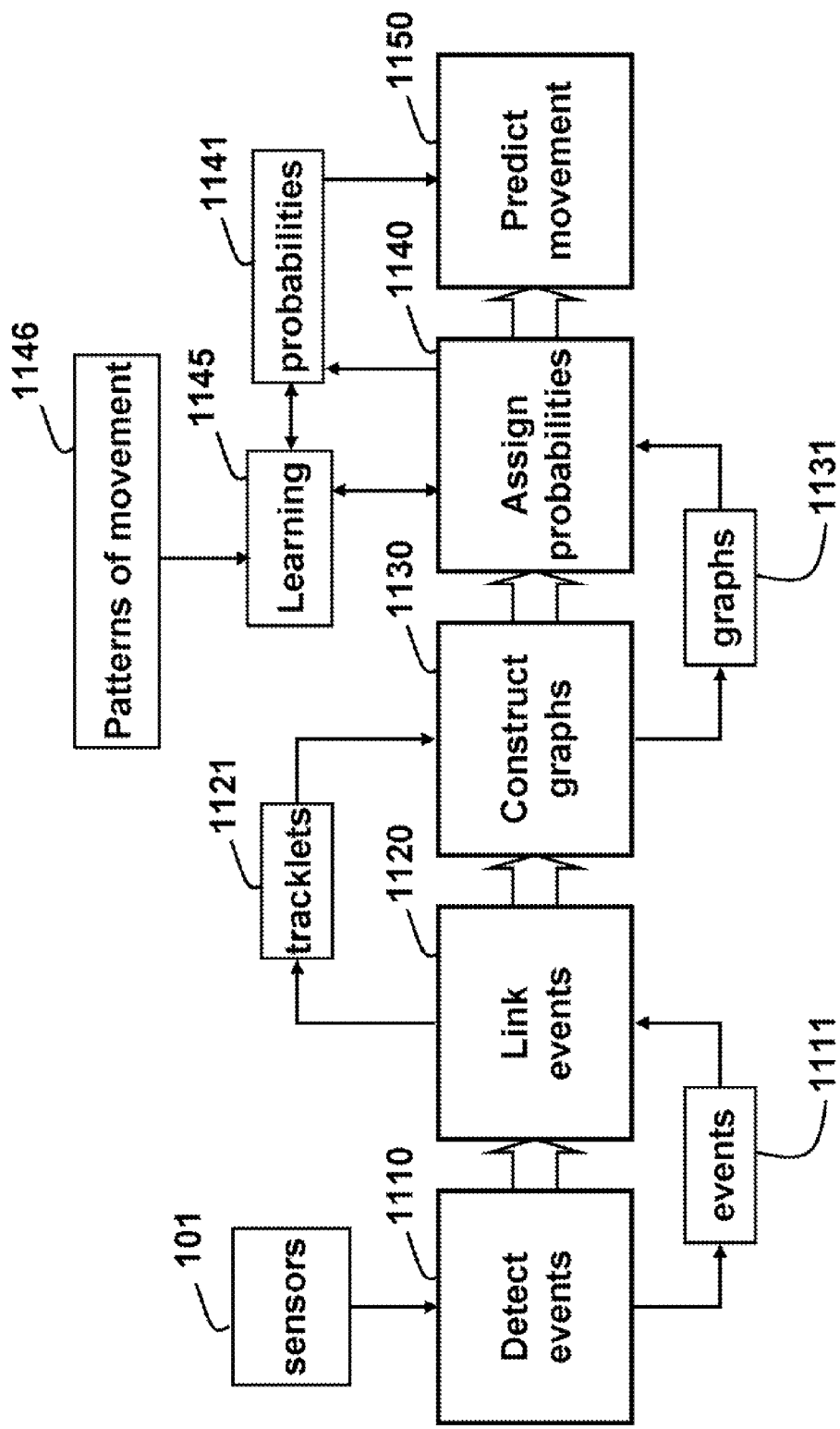
FIG. 11 is a flow diagram of a method for modeling and predicting

FIG. 11 shows the steps of the general method. Events 1111 caused by moving objects are detected 1110 with a set of sensors 101 arranged at known locations in an environment. Sequences of temporally and spatially adjacent events are linked 1120 to form a set of tracklets 1121. A set of directed graphs 1131 is constructed 1130 from the set of tracklets. The graphs including at least one starting node, at least one terminating node, and one or more intermediate nodes where multiple tracklets connect giving rise to ambiguities to the movement of the objects. Probabilities 1141 are assigned 1140 to edges to indicate likelihoods that the objects were at particular locations to model the movement of the objects in the environment. The probabilities 1141 can be refined based on information, such as patterns of movement 1146, learned 1145 over time. The graphs annotated with the probabilities can then also be used to predict movement of the objects.

Effect of the Invention

The goal of the invention is to provide a system and method for tracking and identifying moving objects, e.g., people, using a mixed network of various sensors, cameras and a surveillance database.

A small number of PTZ cameras are arranged in an environment to be placed under surveillance. Even though the number of cameras is relatively small, the amount of video data can exceed many terabytes of storage.

The video cameras can only acquire images of a part of the environment. This makes it difficult to perform object tracking and identification with just the cameras. Even if the camera coverage was complete, the time to search the video data would be impractical.

Therefore, the environment also includes a dense arrangement of sensors, which essentially cover all public areas. The events have an associated sensor identification and time. This makes total amount of sensor data quite small and easy to process. Activation events of the sensors, in terms of space and time, can be correlated to video images to track specific individuals, even though the individuals are not continuously seen by the cameras.

It is possible to contract directed graphs represented the movement of the objects in the environment. In the graphs, there are starting nodes, terminating nodes, and intermediate nodes. The intermediate nodes lead to ambiguities. Probabilities are assigned to the edges connecting the nodes to indicate the likelihoods that object start and terminate their movement at particular locations. From the probabilities, the movement of objects can be predicted, even though there may be ambiguities in the movement and the representative graphs.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A computer implemented method for modeling movement of objects in an environment, comprising:
   detecting discrete events caused by objects moving in an environment with a set of sensors arranged at known locations in the environment;
   linking sequences of temporally and spatially adjacent discrete events to form a set of tracklets;
   constructing a set of directed graphs from the set of tracklets, the graphs including at least one starting node, at least one terminating node, and one or more intermediate nodes where multiple tracklets connect giving rise to ambiguities in the movement of the objects, in which the starting node is A and a terminating node is Z and a graph $\gamma_0$ models the movement of a particular object from node A to node Z, and a probability $P(A \prec Z|\gamma_0) = 1$ if a particular object starting at node A always terminated at node Z in the graph $\gamma_0$, where z,900 indicates follows; and
   assigning probabilities to the nodes, the probabilities indicating likelihoods that the objects were at particular known locations to model the movement of the objects in the environment.

2. The method of claim 1, in which the sensors are binary motion sensors.

3. The method of claim 1, in which the sensors using wireless transmitters for transmitting the events.

4. The method of claim 1, in which the linking is performed according to temporal and spatial constraints.

5. The method of claim 4, in which the temporal and spatial constraints are learned over time.

6. The method of claim 1, in which a particular probability is associated with a particular object.

7. The method of claim 1., in which the intermediate nodes include split nodes where multiple tracklets diverge, and join nodes where multiple tracklets converge.

8. The method of claim 1, in which a starting node is A, a terminating node is Z, and $\Gamma$ is a set of graphs $\gamma_t$, and $$P(A \prec Z|\Gamma) = \frac{\sum_{i=0}^{N} P(A \prec Z|\gamma_i)}{M},$$

where N in the number of graphs in the set $\Gamma$, and the number of graphs that contain the node A as the starting node is M, where z,900 indicates follows.

9. The method of claim 8, in which a probability:

$$P(A \prec \Theta|\Gamma) = \frac{\sum_{i=0}^{N} P(A \prec Z|\gamma_i) \forall Z \in \Theta}{M},$$

where $\Theta$ is a set of terminating nodes.

10. The method of claim 9, in which a probability $$P(\Phi \prec \Theta|\Gamma) = \frac{\sum_{i=0}^{N} P(A \prec Z|\gamma_i) \forall A \in \Phi, Z \in \Theta}{M},$$

where $\Phi$ is a set of starting nodes.

11. The method of claim 10, in which the sets $\Phi$ and $\Theta$ can be discontinuous.

12. The method of claim 1, further comprising:
    predicting the movement of the objects from the set of graphs with the assigned probabilities.

13. The method of claim 1, further comprising:
    rank ordering the probabilities of the terminating nodes.

14. The method of claim 1, in which the probability P is 0 if a particular object is not at a particular known location, and 1 if the particular object is at the known location, and 0<P<1 otherwise.

* * * * *